2,817,646
Patented Dec. 24, 1957

2,817,646
PROCESS FOR PREPARING LACTAMS AND AMIDES

George B. Payne, Berkeley, Calif., assignor to Shell Development Company, New York, N. Y., a corporation of Delaware No Drawing. Application December 6, 1955
Serial No. 551,239

11 Claims. (Cl. 260—78.3)

This invention relates to novel processes for the preparation of lactams, polylactams and amides. More particularly, it relates to novel processes for the preparation of such products from the reaction of lactones, ammonia and hydrogen.

Lactams are used for the production of polyamides suitable for the manufacture of fabrics, films, fibers, coating compositions, and the like. Heretofore, the usual preparation of lactams has been by Beckmann rearrangement of ketoximes. Caprolactam, the most important member of this class, has long been prepared by rearrangement of cyclohexanone oxime. However, it has been necessary to prepare the cyclohexanone oxime intermediate by means of one or more reactions. For example, the preparation of the oxime by treating nitrocyclohexane or its salts with hydroxylamine, hydrogen, ammonia, amines, sulfides, olefins, alkylene oxides, and the like is well-known in the art. It is also known to prepare cyclohexanone oxime by treatment of cyclohexanone with hydroxylamine, by treatment of cyclohexanone-bisulfite complexes with nitrous acid, and by like processes. Although such multi-step processes for the preparation of lactams have generally produced satisfactory products, the need has long been recognized for a process whereby lactams could be prepared in a single reaction.

It is an object of this invention to provide new processes for the preparation of monomeric and polymeric lactams. It is yet another object of this invention to provide such processes which will effect a substantial lowering in cost. It is still another object of this invention to provide an inexpensive process for the preparation of lactams by the use of standard equipment and inexpensive raw materials. It is a further object of this invention to provide novel processes for the preparation of hydroxyamides and aminoamides. It is yet another object of this invention to provide new processes for the preparation of nylon precursors. Other objects will become apparent as the description continues.

These and other objects are accomplished by the reaction of a lactone having 5 to 8 atoms in the ring, one of which is oxygen, with an ammonia yielding compound selected from the group consisting of an amine and ammonia with hydrogen in the presence of a hydrogenation catalyst.

While the reaction mechanisms or intermediate reactions involved are not known for certain, the scope of the process may be represented by the following equation:

wherein A is a divalent chain of three to six carbon atoms, R is hydrogen or a substituent, n is an integer of 3 to 5 and x is a variable number indicating a polymer. Reactions involving ammonia and hydrogen and other materials are known in which monomeric lactams result but such reactions are to be distinguished from those of this invention wherein the starting material is a lactone and the final product may comprise a polylactam.

The products which are produced by the process of this invention are related to the starting lactone in that they have the same number of atoms in their chain or ring as were present in the lactone. Thus, for example, where the starting lactones are butyrolactones, pentanolactones, hexanolactones and the like, the final products may include the corresponding butyrolactams, pentanolactams, hexanolactams, and, under certain conditions, polymers thereof having 5, 6 and 7 atoms respectively, in a chain unit. Under certain circumstances, various aliphatic amides and hydroxy amides having the same number of carbon atoms as were present in the starting lactone are obtained. This is better illustrated by Table I which indicates various starting materials and the products which may be obtained therefrom, but it will be recognized that this is merely illustrative as the products and the quantities actually produced will vary considerably as will hereinafter appear.

TABLE I

| Starting Lactones | Product | | | |
|---|---|---|---|---|
| | Lactam | Polylactam | Hydroxyamide | Aminoamide |
| Butyrolactones | Butyrolactams | | ω-hydroxybutyramides | ω-aminobutyramides |
| Pentanolactones | Pentanolactams | | ω-hydroxypentanamides | ω-aminopentamides |
| Hexanolactones | Hexanolactams | Polyhexanolactams | ω-hydrozyhexanamides | ω-aminohexanamides |
| Heptanolactones | Heptanolactams | Polyheptanolactams | ω-hydroxyheptanamides | ω-aminoheptanamides |

As previously indicated, the starting lactones of this invention are those that have 5 through 8 carbon atoms in the ring. The particular starting material may or may not contain substituents on the divalent chain of 3 to 5 carbon atoms, the divalent chain being represented by A in the above formula. In its simplest form, A is selected from divalent hydrocarbons having the formula ($—C_nH_{2n}—$) where n is 3 to 6. However, A is not limited thereto as any or all the hydrogens may be substituted with halogen atoms and/or functional groups such as hydroxy, carboxy, ether, thioether and the like, or the same or different hydrocarbon radicals of 1 to 12 carbon atoms, for instance, alkyl, cycloaliphatic and aromatic hydrocarbon radicals, which hydrocarbon radicals can be substituted by the foregoing functional groups or by halogen atoms.

Among the hydrocarbon substituted lactones which may be starting materials in the processes of this invention are the aliphatics, preferably of 1 to 12 carbon atoms such as 1-methylbutyrolactone, 2-hexylbutyrolactone, 3-dodecabutyrolactone, 1-ethylpentanolactone, 2-nonylpentanolactone, 4-undecapentanolactone, 1,1-dimethylhexanolactone, 1-ethyl-4-propyl hexanolactone, 1,2,3-trimethyl-4-butyl hexanolactone, 1,2,3,4-tetramethylheptanolactone, 3,5-dodecaheptanolactone, 2-ethyl-3-butyl-4,4-dodecaneheptanolactone, and the like.

The hydrocarbon substituents are not limited to aliphatic hydrocarbons as aromatic and mixtures of aliphatic and aromatic hydrocarbons can also be used such as 1-phenylbutyrolactone, 2-ethyl-3-phenylbutyrolactone, 1-phenyl-2-

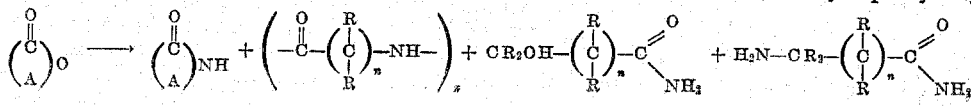

methylpentanolactone, 1,1-dimethyl-3-cyclohexylpentanolactone, 2-phenylhexanolactone, 1-cyclohexyl-4-methylhexanolactone, 1,2,3 - trimethyl-4-phenylheptanolactone, 2,4-diphenylheptanolactone, and the like.

The variety of other substituents that may be present are further represented by 1-phenyl-2-iodobutyrolactone, 1-chloromethylbutyrolactone, 1 - methoxyheptanolactone, and the like.

As a result of the substituents on the starting lactone, the final monomeric materials will have the corresponding substituents on the same relative carbon atom. Thus, for example, when 1-methylhexanolactone is the starting material the final products may comprise 1-methylhexanolactam, ω - hydroxy - 1 - methylhexanamide, ω-amino-1-methylhexanamide and polymeric material. It will be noted, however, that fiber-forming material apparently does not form when the substituent is a functional group. For that reason it is preferred that the starting material of this invention be free of functional groups. The most preferred starting materials are butyrolactone, pentanolactone, hexanolactone and heptanolactone. Simple aliphatic hydrocarbons may be substituted on these lactones but it is not desirable where the desired end product is a polymeric substance, particularly in regard to polyhexanolactam which is a valuable precursor in the manufacture of nylon. However, where the linear substituted amines or amides are the desired end products, the process of this invention can be easily modified to provide such products.

The compound that provides the nitrogen to the lactam may be derived either from ammonia or an ammonia-yielding amine. When an amine is used, its nature may be varied widely. For example, it may be any monoamine which has at least one hydrogen atom attached to the amino nitrogen atom and which is composed of hydrocarbon structure attached to the amino group. Structurally, ammonia and such amines may be represented as follows:

wherein each of $R_1$ and $R_2$ is selected from the class consisting of hydrogen atoms, alkyl and aryl radicals. Specific compounds which possess this formula include ammonia and primary amines such as methylamine, ethylamine, propylamine, butylamine, hexylamine, aniline, m-toluidene, mesidine, cyclohexylamine, benzylamine, 1-naphthylamine, 1-naphthalenemethylamine, 1-fluorenamine and the like. Also included are secondary amines such as dimethylamine, diethylamine, dipropylamine, dibutylamine, dihexylamine, diphenylamine, N-phenylbenzylamine, N-cyclohexylheptylamine, phenylethylamine and the like. All of these amines consist of hydrocarbon structure attached to an amino group which amino group has at least one hydrogen atom attached to nitrogen.

Although the lactone and ammonia, or any amine of the type disclosed, may be utilized successfully in the reaction of this invention, best results are obtained when the lactones are reacted with ammonia or with saturated aliphatic primary and secondary monoamines, preferably containing from 1 to 6 carbon atoms such as methylamine, ethylamine, propylamine, butylamine, amylamine, hexylamine, dimethylamine, diethylamine and dipropylamine to form the corresponding lactam.

Among the factors which are observed to effect the nature and quantity of the final products, the most important are the temperature and the quantity of the reactants, e. g., the lactone and the ammonia or ammonia-yield compound. Of secondary importance, but nevertheless to be carefully considered, are the pressure, reaction times, quantity of the catalyst and whether the reaction is conducted in the liquid or vapor phase.

Of the several variables the temperature is probably the most important as higher temperatures produce higher yields of the lactams and polylactams while lower temperatures will cause higher yields of the aminoamides and hydroxyamides. Preferred temperatures range from about 200° C. to 225° C. but may range from 175° C. to 250° C. The lower temperatures, in combination with low pressures, will tend to produce the aminoamides rather than the lactams.

Of comparable importance to the temperature in determining the nature of the final products is the quantity of the reactants. When this consideration is combined with the effects of temperature, the nature of the products can be closely controlled. As previously indicated, the quantity of the reactants may be widely varied depending on the final products desired. As a general rule, it may be stated that when the ratio of available ammonia to lactone is high, the yield of polymer will be higher. Thus, ratios in the order of 6:1 of ammonia to lactone produce satisfactory yields of polylactam that are easily hydrolyzed, purified and reconverted to a more highly purified polymer. The ratio may be still higher, i. e., about 10:1, but it usually is not necessary since various catalysts seem to have the effect of more efficient utilization of the ammonia. The mole ratio may be as low as 1:1 but the products will be predominantly the aminoamides and the hydroxyamides.

It is found that the pressures aer not as critical as the temperatures for the production of the lactams and polylactams and may, therefore, be varied over a wide range of from about 100 p. s. i. g. to about 600 p. s. i. g. with 150–525 p. s. i. g. being preferred. As a matter of economy, no practical advantage results from using high pressures with high temperatures, it being more beneficial to operate at high temperatures with low pressures. When referring to "pressures," it will be understood that this term makes reference to the total pressure of the hydrogen and ammonia.

The time required for the reaction to be completed will depend mainly on the temperatures, pressures and lactone involved. Where the temperatures are predominantly high, irrespective of the pressures used, reaction times will generally be lower, that is, in the order of 4 to 6 hours for hexano- and higher lactones. Where the temperatures are predominantly low, reaction times in the order of 6 to 8 hours will be required. Since the lactone ring is more readily opened in the case of butyro- and pentano-lactone, considerably lesser time will be required.

It is found that variations in the hydrogenation catalyst will effect the nature and quantity of the final products. The preferred catalysts are Raney nickel and palladium on charcoal but any of the conventional hydrogenation catalysts may be used such as, preferably, the metals of groups I, II and IV to VIII of the periodic table of elements, their alloys and derivatives such as their sulfides, oxides and chromites. Examples include silver, copper, iron, manganese, molybdenum, platinum, chromium, cobalt, rhodium, tungsten, mixtures of metals, such as copper-silver mixtures, copper-chromium mixtures, nickel-cobalt mixtures, and their derivatives such as copper oxide, copper chromite, nickel sulfide, silver sulfide, and the like. Particularly preferred catalysts are the members of the group consisting of nickel, copper, cobalt, iron, chromium, silver and platinum, and their oxides, sulfides and chromites. These catalysts may be employed in a finely divided form and dispersed in and throughout the reaction mixture, or they may be employed in a more massive state, either in essentially the pure state or supported upon or carried by an inert carrier material such as pumice, kieselguhr, diatomaceous earth, clay, alumina, charcoal, carbon or the like, and the reaction mixture contacted therewith as by flowing the mixture over or through a bed of the catalyst or according to other methods known in the art.

The hydrogenation may be executed in any suitable manner and in any suitable apparatus of the type that is customarily employed for hydrogenation processes. A method of carrying out the process that has been found to be advantageous comprises placing the lactone and catalyst in a pressure-resistant vessel equipped with the necessary inlets and outlets heating means, pressure gauge, thermometer, etc. and desirably with means for agitating the contents. The mixture is subjected to the action of hydrogen gas under the aforedescribed conditions of temperature and pressure until the reaction is complete as indicated by the hydrogen adsorption.

The amount of the catalyst employed may vary over a considerable range depending upon the type of catalyst employed, the specific polymer, etc. In general, the amount of the catalyst will vary from 1% to 30% by weight of the reactants. Preferred amounts of catalyst range from 10% to 20% by weight.

While the reaction may be conducted in a solvent, it is preferred that none be used when it can be avoided. When the particular starting lactone is a liquid at room temperatures or at temperatures under which the reaction is to be conducted, no solvent is required. However, when the lactone is solid or not easily liquefied under high temperatures, then a solvent must be used. The solvent must be carefully selected to avoid its participation in the reaction as, for example, in the case of lower alcohols. Also particularly objectionable are those solvents that undergo reaction with ammonia such as esters, and the like. It appears that the suitable solvents are the saturated aliphatic hydrocarbons such as pentane, hexane, octane, and the like. Aromatic hydrocarbons may also be used such as toluene, benzene and the like.

The following examples will illustrate the process of this invention.

Example I

To 57 parts of ω-hexanolactone in a stainless steel autoclave is added 10 parts of neutral Raney nickel and 51 parts of anhydrous ammonia. Hydrogen is added at room temperature until the total pressure of the ammonia and hydrogen is about 525 p. s. i. g. With constant agitation the temperature of the reaction mixture is raised to about 225° C. and held at this temperature for about 8 hours. The autoclave is cooled and vented and the contents removed by rinsing with warm ethanol. The catalyst is removed by filtration or centrifuging and the filtrate is concentrated to a residue of about 59 parts. Claisen-distillation of the residue affords the following:

| Cut | Temp./Press. | Yield, parts | |
|---|---|---|---|
| I | 95–105° C./1 mm | 5.5 | solid. |
| II | 105–165° C./1 mm | 5.0 | semi-solid. |
| III | 165–167° C./1 mm | 4.7 | solid. |
| Residue | | 42.0 | |

Cut I is recrystallized from chilled acetone to yield about 10%, based on lactone, of a white solid identified as ω-hexanolactam. M. P. 67.5–68.5° C.

Analysis of cut II indicates the presence of about 50% by weight of ω-aminohexanamide. Basicity value, 0.39 eq./100 g.

Cut III represents a yield of about 9% calculated as a mixture of ω-hydroxyhexanamide and ω-aminohexanamide. Basicity value, 0.21 eq./100 g.

The residue represents a 70% conversion of lactone to poly(ω-hexanolactam) (found, N, 11.3).

Example II

The procedure of Example I is repeated except that the following quantities are used: 114 parts of ω-hexanolactone, 20 parts of Raney nickel and 38 parts of anhydrous ammonia and the total pressure is 165 p. s. i. g. As in Example I, the mixed reaction products are treated with warm ethanol and the catalyst removed by filtration. The filtrate is concentrated until a precipitate appears after which the solution is chilled and the resultant precipitate separated (M. P. 130–135° C.). Recrystallization from 400 parts of boiling water yields a product (M. P. 153–155° C.) having an analysis in agreement with a polymer of ω-hexanolactam containing an average of about six monomer units. Found: C, 61.9, H, 9.9, N, 12.1, molecular weight 650. Theory for $C_{36}H_{68}O_7N_6$: C, 62.0, H, 9.8, N, 12.1, molecular weight 697. The filtrate remaining from the initial separation is Claisen-distilled as in Example I to yield the same products. The polymer recovered from the residue is added to that previously recovered to give a total yield in excess of 70%. The monomeric lactam is yielded in about 6% based on the lactone.

Example III

The procedure of Example II is repeated except that the reaction is conducted at 175° C. The product contains over 80% ω-hydroxyhexanamide, about 9% of the polylactam and about 2% monomeric lactam.

Example IV

The procedure of Example II is repeated except that 5% palladium on charcoal is substituted for the Raney nickel catalyst. The product is almost entirely polymeric hexanolactam and is of much higher molecular weight than that previously obtained.

Example V

The procedures of Examples I through III are repeated except that the ω-hexanolactone is replaced with 1,1-dimethylhexanolactone, 1-ethyl-3-propyl hexanolactone and 1,2,3-trimethyl-4-butyl hexanolactone, respectively. The products produced are the corresponding lactams, hydroxyamides and aminoamides with considerably smaller quantities of the polymeric material formed which may be due to the substitutions.

Example VI

The procedure of Example I is repeated except that 1-methyl-butanolactone replaces the hexanolactone. The products are predominantly the lactam and the mixed amides.

Example VII

The procedure of Example II is repeated except that 2-nonyl-pentanolactone is used to produce the corresponding lactams and amides as the major product. Little polymer is formed which may be due to the difficulty of polymerizing this lactam and/or the effect of the substituent.

Example VIII 1-methylheptanolactone and 1-methyl-2-phenyl heptanolactone are used in the procedure of Examples I and IV, respectively, to produce in addition to the amide and lactams a quantity of a polymeric material.

Example IX

The procedure of Example I is repeated except that 1-chloro-5-methylbutanolactone is used with the production of the corresponding lactam, hydroxychloroamides and aminochloroamides. No polymeric material is observed to have been formed.

Similar results are obtained when functional substitutions other than chlorine derivatives are used.

Example X

The procedure of Example I is repeated using methylamine to replace the ammonia with the same products being formed. Analogous results are obtained with butylamine.

Example XI

The procedure of Example I is repeated using 3-hydroxypentanolactone at 200° C. and 400 p. s. i. g. for 4 hours. The product comprises a mixture of 5-amino-3-hydroxypentylamide and 3,5-dihydroxypentylamide,

Example XII

Following the procedure of Example I using 4-phenyl-hexanolactone, an unidentified resinous material is produced.

By following the above indicated procedures, ethers of the hydroxyamides and aminoamides are produced when such radicals are substituted on various lactones thus indicating that functional groups tend to inhibit, or prevent, the formation of polymeric material by the process of this invention.

After the reaction of the lactone, ammonia or ammonia yielding amine and hydrogen is completed, the product, whether a lactam or amide or mixtures of both, may be removed from the reaction vessel by rinsing with any of the several common solvents such as methanol, ethanol, isopropanol, t-butanol and the like; ethers such as diethyl ether, dioxane, and the like; esters and ketones such as methyl and ethyl acetate, acetone, methyl ethyl ketone, and the like; hydrocarbons such as benzene, toluene, and the like. The products are then isolated from the solvent by any conventional means after the catalyst is filtered off, such as fractional distillation, selective extraction, precipitation, or the like.

The polylactams produced by the process of this invention are of particular value in a variety of applications involving polymers. Thus, they may be used in molding and surface coating compositions, and they may be copolymerized with epoxy resins. Of special value are the polymers of ω-hexanolactam, or more commonly referred to as ε-caprolactam, which are used in the preparation of synthetic fibers. As prepared according to the process of this invention, the poly-ω-hexanolactam is preferably hydrolyzed to the monomer by refluxing in hydrochloric acid in order to purify it. The purified monomer thus prepared is added to monomeric material that may have been previously separated from the reaction mixture and then polymerized to resinous or fiber-forming materials. The purification of the polymeric material is important if it is to be formed into a fiber but purification is not as essential if the polymer is to be used in other resinous applications such as moldings and the like. The hydrolysis comprises treating the polymer with dilute mineral acids such as hydrochloric acid, sulfuric acid, phosphoric acid, or the like, whereby the polymer units are broken down and amine salts of the hydrolyzing acid are formed. The quantity of the acid to be used will depend on the particular polymer used but it should be present in excess of one mole of acid for each —NH— group in the polymer. The monomer is regenerated by treating the amine salt with a basic material such as ammonium hydroxide, the alkali metal hydroxides and the like. From the thus purified monomer the polymer material may be prepared.

I claim as my invention:

1. A process which comprises reacting a lactone having 5 to 8 atoms in its ring with an ammonia yielding compound selected from the group consisting of an amine and ammonia, and with hydrogen in the presence of a hydrogenation catalyst at temperatures ranging from about 175° C. to about 250° C. and a total pressure from about 100 p. s. i. g. to about 600 p. s. i. g.

2. The process of claim 1 in which the lactone is selected from the group consisting of omega butanolactone, omega pentanolactone, omega hexanolactone and omega heptanolactone.

3. The process of claim 2 in which the lactone is omega hexanolactone.

4. The process of claim 1 in which the ammonia yielding compound is ammonia.

5. The process according to claim 2 in which the lactone is omega heptanolactone.

6. The process of claim 1 in which the mole ratio of lactone to ammonia yielding compound is from about 1:10 to about 1:1.

7. The process for the preparation of poly-ω-hexanolactam which comprises reacting omega caprolactone with an ammonia yielding compound selected from the group consisting of an amine and ammonia, with hydrogen in the presence of a hydrogenation catalyst, at a pressure of from about 100 p. s. i. g. to about 600 p. s. i. g. and temperatures ranging from 175° C. to about 250° C., and separating the said lactam.

8. The process of claim 7 wherein the ammonia yielding compound is ammonia.

9. The process of claim 7 wherein the ratio of lactone to ammonia yielding compound is from about 1:10 to about 1:1.

10. A process of claim 1 in which the temperatures range from about 200 to 225° C.

11. A process of claim 7 in which the temperatures range from 200 to 225° C.

References Cited in the file of this patent

UNITED STATES PATENTS 2,181,140    Lazier et al. _____ Nov. 28, 1939

OTHER REFERENCES

Spath et al.: Berichte, Deutsche Chemische Gesellschaft, volume 69B, pages 2727–2731 (1936).